(12) United States Patent
Jang

(10) Patent No.: US 9,007,471 B2
(45) Date of Patent: Apr. 14, 2015

(54) DIGITAL PHOTOGRAPHING APPARATUS, METHOD FOR CONTROLLING THE SAME, AND COMPUTER-READABLE MEDIUM

(75) Inventor: Soon-geun Jang, Seognam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 12/977,019

(22) Filed: Dec. 22, 2010

(65) Prior Publication Data

US 2011/0157383 A1 Jun. 30, 2011

(30) Foreign Application Priority Data

Dec. 28, 2009 (KR) ........................ 10-2009-0131802

(51) Int. Cl.
*H04N 5/228* (2006.01)
*H04N 5/235* (2006.01)
*H04N 5/232* (2006.01)

(52) U.S. Cl.
CPC ....... *H04N 5/23248* (2013.01); *H04N 5/23254* (2013.01)

(58) Field of Classification Search
CPC ......................... H04N 5/2327; H04N 5/23277
USPC ...................................... 348/208.6
See application file for complete search history.

(56) References Cited

U.S. PATENT DOCUMENTS

| 2005/0013501 A1* | 1/2005 | Kang et al. ..................... 382/254 |
| 2008/0170126 A1* | 7/2008 | Tico et al. .................. 348/208.6 |
| 2008/0175508 A1* | 7/2008 | Bando et al. .................. 382/255 |
| 2009/0002504 A1* | 1/2009 | Yano et al. ................. 348/218.1 |
| 2011/0090352 A1* | 4/2011 | Wang et al. ................ 348/208.6 |

OTHER PUBLICATIONS

Levin, "Blind Motion Deblurring Using Image Statistics," Advances in Neural Information Processing Systems (NIPS), pp. 841-848 (2006).

Raskar et al., "Coded Exposure Photography: Motion Deblurring using Fluttered Shutter," ACM Trans. Graph., vol. 25(3), pp. 795-804 (2006).

Richardson, "Bayesian-Based Iterative Method of Image Restoration," Journal of the Optical Society of America, vol. 62(1), pp. 55-59 (Jan. 1972).

* cited by examiner

*Primary Examiner* — Jason Flohre

(74) *Attorney, Agent, or Firm* — Drinker Biddle & Reath LLP

(57) ABSTRACT

A method of controlling a digital photographing apparatus successively photographs one short exposure image and a plurality of long exposure images. A global motion of each of the long exposure images is compensated based on the one short exposure image. A Point Spread Function (PSF) of each of the one short exposure image and the long exposure images are extracted. A shake correction image is extracted through a repeat estimation by determining an initial value of the repeat estimation based on the one short exposure image and the long exposure images and using each PSF.

22 Claims, 8 Drawing Sheets

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix}$$

FIG. 8A $L_0$ $L_1 = L_0 + \beta_1 m_1 + \lambda \|\nabla L_0\|$    $m_1 = \nabla f_{data}(L_0)$ $L_2 = L_1 + \beta_2 m_2 + \lambda \|\nabla L_1\|$    $m_2 = \nabla f_{data}(L_0) \odot \nabla f_{data}(L_1)$ $L_3 = L_2 + \beta_3 m_3 + \lambda \|\nabla L_2\|$    $m_3 = \nabla f_{data}(L_1) \odot \nabla f_{data}(L_2)$ $\vdots$    $\vdots$ $L_i = L_{i-1} + \beta_i m_i + \lambda \|\nabla L_{i-1}\|$    $m_i = \nabla f_{data}(L_{i-2}) \odot \nabla f_{data}(L_{i-1})$

FIG. 8B $$\begin{pmatrix} X' - PSF_X \otimes L_0 \\ Y - PSF_Y \otimes L_0 \\ Z' - PSF_Z \otimes L_0 \end{pmatrix} \xrightarrow{AVERAGE} I_{avr}$$

$$\begin{pmatrix} PSF_X^* \otimes I_{avr} \\ PSF_Y^* \otimes I_{avr} \\ PSF_Z^* \otimes I_{avr} \end{pmatrix} \xrightarrow{AVERAGE} m_1$$

DIGITAL PHOTOGRAPHING APPARATUS, METHOD FOR CONTROLLING THE SAME, AND COMPUTER-READABLE MEDIUM

CROSS-REFERENCE TO RELATED PATENT APPLICATION

This application claims the priority benefit of Korean Patent Application No. 10-2009-0131802, filed on Dec. 28, 2009, in the Korean Intellectual Property Office, the disclosure of which is incorporated herein in its entirety by reference.

BACKGROUND

1. Field of the Invention

Embodiments relate to a device and a method for correcting a shake, and more particularly, to a digital photographing apparatus having a shake correction function, a method of controlling the same, and a computer-readable storage medium for performing the method.

2. Description of the Related Art

A digital photographing apparatus photographs a subject by converting an optical signal, which is input through an optical unit such as a lens and a diaphragm, into an electrical signal at an image pickup device. The image pickup device receives the optical signal from the subject while a shutter is opened, thereby exposing the image pickup device. If the digital photographing apparatus is shaken due to hand trembling of a user or the like while the shutter is opened, there occurs a shake on a photographed image. The digital photographing apparatus may provide a function of correcting the shake generated due to the hand trembling of the user.

SUMMARY

Embodiments include a digital photographing apparatus having a shake correction function, a method of controlling the same, and a non-transitory computer-readable storage medium.

According to an embodiment, a method of controlling a digital photographing apparatus comprises: successively photographing one short exposure image and a plurality of long exposure images; compensating a global motion of each of the long exposure images based on the one short exposure image; extracting a Point Spread Function (PSF) of each of the one short exposure image and the long exposure images; and extracting a shake correction image through a repeat estimation by determining an initial value of the repeat estimation based on the one short exposure image and the long exposure images and using each PSF.

According to various embodiments, a shake correction image is extracted by using the MAP estimation. To this end, a process of extracting the shake correction image may repeatedly estimate an estimation image by using a data function and a prior distribution function, wherein the data function is determined by Laplacian of a cost function and the prior distribution function is based on a prior distribution of the estimation image, wherein the cost function indicates a difference between a first image, which is a convolution of the PSF and the estimation image, and a shake image.

The prior distribution function may be determined by Laplacian of the estimation image. However, the scope of the invention is not limited to embodiments which use Laplacian prior.

According to an embodiment, an initial value of the MAP estimation is determined by using one sheet of a short exposure image and a plurality of long exposure images. Accordingly, an initial value of the estimation image may be determined as an average image of the one short exposure image and the long exposure images; an initial value of the data function may be determined by obtaining an average of data function values of each of the one short exposure image and the long exposure images; and an initial value of the prior distribution function may be determined as a prior distribution function value of the average image of the one short exposure image and the long exposure images.

The cost function may be a norm of the first image and the shake image, and the data function may be Laplacian of the cost function.

According to another embodiment, a digital photographing apparatus comprises: a repeat photographing control unit that successively photographs one short exposure image and a plurality of long exposure images; a global motion compensating unit that compensates each global motion of the long exposure images based on the one short exposure image; a Point Spread Function (PSF) extracting unit that extracts a PSF of each the one short exposure image and the long exposure images; and a shake correction image extracting unit that determines an initial value of a repeat estimation based on the one short exposure image and the long exposure images, and extracts a shake correction image through the repeat estimation using each PSF.

According to another embodiment, a non-transitory computer-readable storage medium has stored thereon a program executable by a processor for performing a method of controlling a photographing apparatus, the method comprising: successively photographing one short exposure image and a plurality of long exposure images; compensating a global motion of each of the long exposure images based on the one short exposure image; extracting a Point Spread Function (PSF) of each of the one short exposure image and the long exposure images; and determining an initial value of a repeat estimation based on the one short exposure image and the long exposure images; and extracting a shake correction image through the repeat estimation using each PSF.

According to another embodiment, a method of controlling a digital photographing apparatus for photographing an image comprises: firstly photographing a short exposure image using a first exposure time; secondly photographing a long exposure image using a second exposure time, the secondly photographing repeatedly performed a predetermined number of times; and extracting a shake correction image from the short exposure image and the repeatedly photographed long exposure images, wherein the firstly photographing, the secondly photographing, and the extracting the shake correction image are performed in response to an input of a signal of one shutter-release, a sum of total exposure time of the firstly photographing and the repeatedly performed secondly photographing is determined according to a set exposure time set in the digital photographing apparatus, and the first exposure time is shorter than the second exposure time.

The method may further comprise: thirdly photographing a long exposure image using the second exposure time, wherein after the secondly photographing is performed using a first number of times and the firstly photographing is performed once, the thirdly photographing is performed using a second number of times, a sum of total exposure time of the firstly photographing, the repeatedly performed secondly photographing, and the thirdly photographing is determined according to the set exposure time set in the digital photographing apparatus.

In various embodiments, the short exposure image and the long exposure images should have the same target brightness. To this end, a gain of an image pickup device of the digital photographing apparatus may be determined so that the short exposure image and the long exposure image have a same brightness.

The first exposure time may correspond to the shortest exposure time supported by the digital photographing apparatus.

According to another embodiment, a digital photographing apparatus comprises: a repeat photographing control unit that photographs a short exposure image using a first exposure time, and repeatedly photographs long exposure images using a second exposure time and a predetermined number of times, in response to an input of a signal of one shutter-release; and a shake correction unit that extracts a shake correction image from the short exposure image and the repeatedly photographed long exposure images, wherein a sum of total exposure time of the short exposure image and the long exposure images is determined according to a set exposure time set in the digital photographing apparatus, and the first exposure time is shorter than the second exposure time.

The repeat photographing control unit may repeatedly photograph the long exposure image using the second exposure time and a first number of times, photographs the short exposure image using the first exposure time once, and repeatedly photographs the long exposure image using the second exposure time and a second number of times.

The repeat photographing control unit may control an image pickup device of the digital photographing apparatus by determining a gain of the image pickup device so that the long exposure image and the short exposure image have a same brightness.

The first exposure time may correspond to the shortest exposure time supported by the digital photographing apparatus.

BRIEF DESCRIPTION OF THE DRAWINGS

The above and other features and advantages will become more apparent by describing in detail exemplary embodiments with reference to the attached drawings in which:

FIGS. 8A and 8B are diagrams for explaining a process of the repeat estimation using the MAP estimation, according to an embodiment;

DETAILED DESCRIPTION

Exemplary embodiments will now be described more fully with reference to the accompanying drawings. The invention may, however, be embodied in many different forms and should not be construed as being limited to the embodiments set forth herein; rather, these embodiments are described so that this disclosure will convey concepts of the invention to those of ordinary skill in the art.

Figure 1:
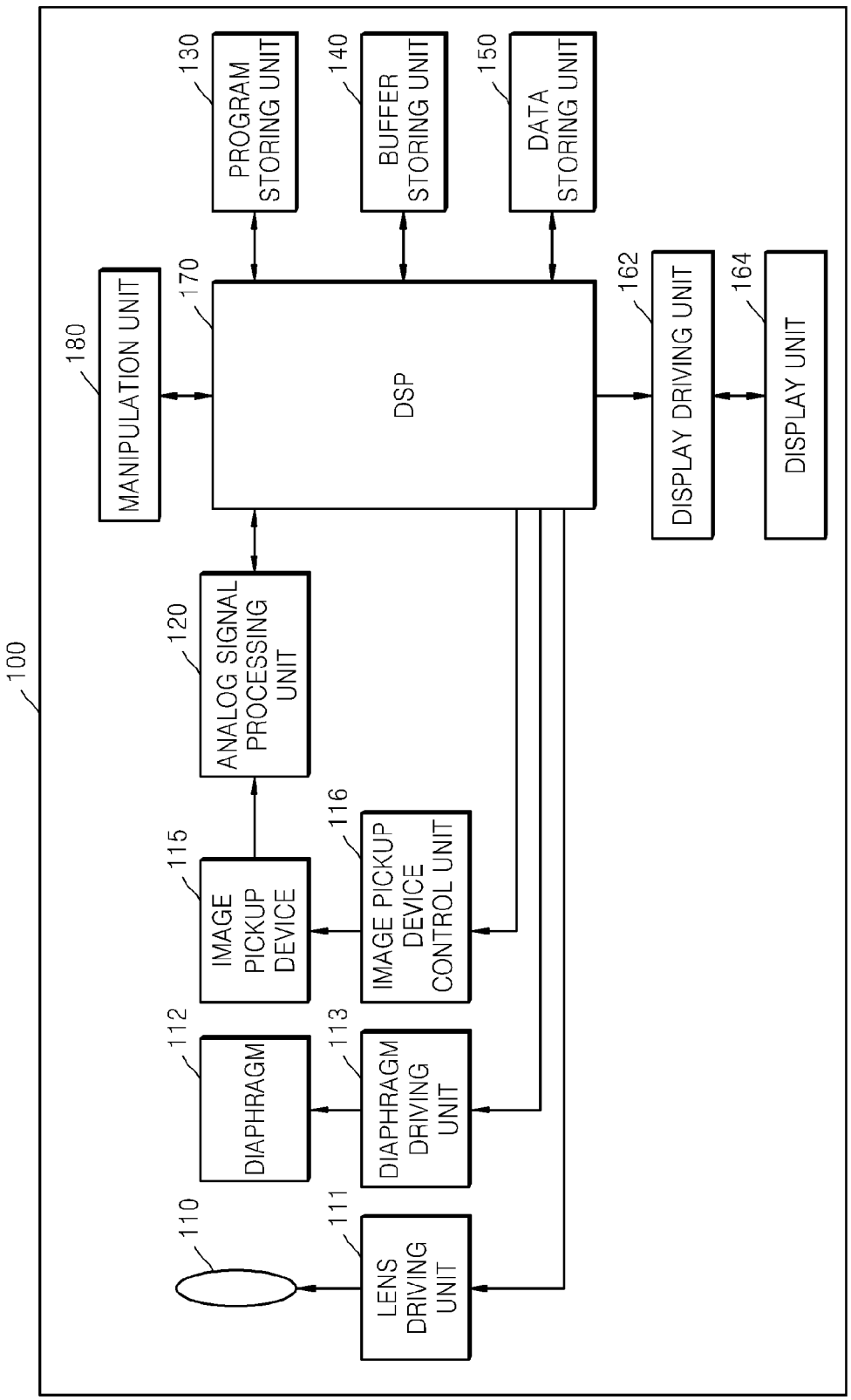
FIG. 1 is a diagram illustrating a schematic structure of a digital photographing apparatus, according to an embodiment.

FIG. 1 is a diagram illustrating a schematic structure of a digital photographing apparatus 100, according to an embodiment.

The digital photographing apparatus 100 according to the embodiment may include a lens 110, a lens driving unit 111, a diaphragm 112, a diaphragm driving unit 113, an image pickup device 115, an image pickup device control unit 116, an analog signal processing unit 120, a program storing unit 130, a buffer storing unit 140, a data storing unit 150, a display driving unit 162, a display unit 164, a digital signal processing unit 170 and a manipulation unit 180.

The lens 110 concentrates light of an optical signal. The lens 110 includes a zoom lens for controlling a view angle to become narrow or wide according to a focal length, and a focus lens for a subject to be in focus. Each of these lenses may be structured with a single lens or a group of a plurality of lenses.

The diaphragm 112 adjusts amount of incident light by adjusting its extent of opening and shutting.

The lens driving unit 111 and the diaphragm driving unit 113 receive a control signal from the digital signal processing unit 170, and respectively drive the lens 110 and the diaphragm 112. The lens driving unit 111 adjusts the focal length by adjusting a position of the lens and performs operations such as auto focusing, zoom variation and focus variation. The diaphragm driving unit 113 adjusts the extent of opening and shutting of the diaphragm 112, and particularly performs operations such as auto focus, auto exposure correction, focus variation and depth of field adjustment by adjusting an f number.

The optical signal which has passed through the lens 110 and the diaphragm 112 arrives at a light-receiving surface of the image pickup device 115 and produces an image of the subject. The image pickup device 115 may use a Charge Coupled Device (CCD) or Complementary Metal Oxide Semiconductor Image Sensor (CIS) which converts the optical signal into an electrical signal. Sensitivity of the image pickup device 115 may be adjusted by the image pickup device control unit 116. The image pickup device control unit 116 may control the image pickup device 115 according to a control signal which is automatically generated by an image signal input in real time, or a control signal which is manually input by a user operation.

The exposure time of the image pickup device 115 is adjusted by a shutter (not illustrated). The shutter may include a mechanical shutter which adjusts the light incidence by moving a cover, or an electronic shutter which controls the exposure to light by supplying the image pickup device 115 with an electrical signal.

The analog signal processing unit 120 performs operations such as noise reduction process, gain adjustment, wave standardization and analog-digital conversion process to an analog signal supplied from the image pickup device 115.

A control signal from the outside such as the user may be input at the manipulation unit 180. The manipulation unit 180 may include a shutter-release button for inputting a shutter-release signal for photographing a picture by exposing the image pickup device 115 to light for a predetermined time, a power button for inputting a control signal for controlling on-off of power, a optical-zoom button and a telescopic-zoom button for narrowing or widening a view angle according to an input, and various function buttons for inputting characters, or selecting a photographing mode or play mode and selecting functions of white balance setting and exposure setting. The manipulation unit 180 may have a form of the above-mentioned various buttons; however, it is not limited by this form. The manipulation unit 180 may be embodied with any form of user's possible input device such as keyboards, touch pads, touch screens and remote controllers.

Also, the digital photographing apparatus 100 includes an operating system for driving the digital photographing apparatus, the program storing unit 130 for storing a program such as an application system, the buffer storing unit 140 for temporarily storing data needed during performing an operation or result data, and the data storing unit 150 for storing various information including an image file which includes an image signal.

In addition, the digital photographing apparatus 100 includes the display unit 164 for displaying an operation state of the digital photographing apparatus 100 or image information photographed by the digital photographing apparatus 100. The display unit 164 may provide the user with visual information and/or audio information. For providing the visual information, the display unit 164 may be structured with, e.g., a Liquid Crystal Display (LCD) or an organic electro-luminescent display. The display driving unit 162 provides a driving signal to the display unit 164.

And, the digital photographing apparatus 100 includes the digital signal processing unit 170 which processes an input image signal and controls each component according to the input image signal or an externally input signal. The digital signal processing unit 170 may reduce a noise of input image data, and perform an image signal process for improving image quality such as gamma correction, color filter array interpolation, color matrix, color correction and color enhancement. Also, by performing a compression process to image data generated by performing the image signal process for improving image quality, an image file may be generated, or image data may be reproduced from the image file. A compression form of an image may be a reversible or irreversible form. For example of appropriate forms, a conversion into a Joint Photographic Experts Group (JPEG) form or a JPEG 2000 form is possible. The compressed data may be stored into the data storing unit 150. The digital signal processing unit 170 may also functionally perform an obscurity process, a color process, a blur process, an edge emphasis process, an image analysis process, an image recognizance process and an image effect process. As the image recognizance process, a face recognizance process and a scene recognizance process may be performed. For instance, a brightness level adjustment, a color correction, a contrast adjustment, an outline emphasis adjustment, a screen split process, a generation of a character image and a synthesizing process of an image may be performed. The digital signal processing unit 170 may be connected to an external monitor and perform a predetermined image signal process for display on the external monitor. The digital signal processing unit 170 may transfer this processed image data so that a corresponding image is displayed on the external monitor.

Also, the digital signal processing unit 170 may generate a control signal for controlling auto focusing, zoom variation, focus variation and auto exposure correction by running a program stored in the program storing unit 130 or with an additional module, and provide the control signal to the lens driving unit 111, the diaphragm driving unit 113 and the image pickup device control unit 116, and collectively control operations of components such as a shutter and a flash provided to the digital photographing apparatus 100.

Figure 2:
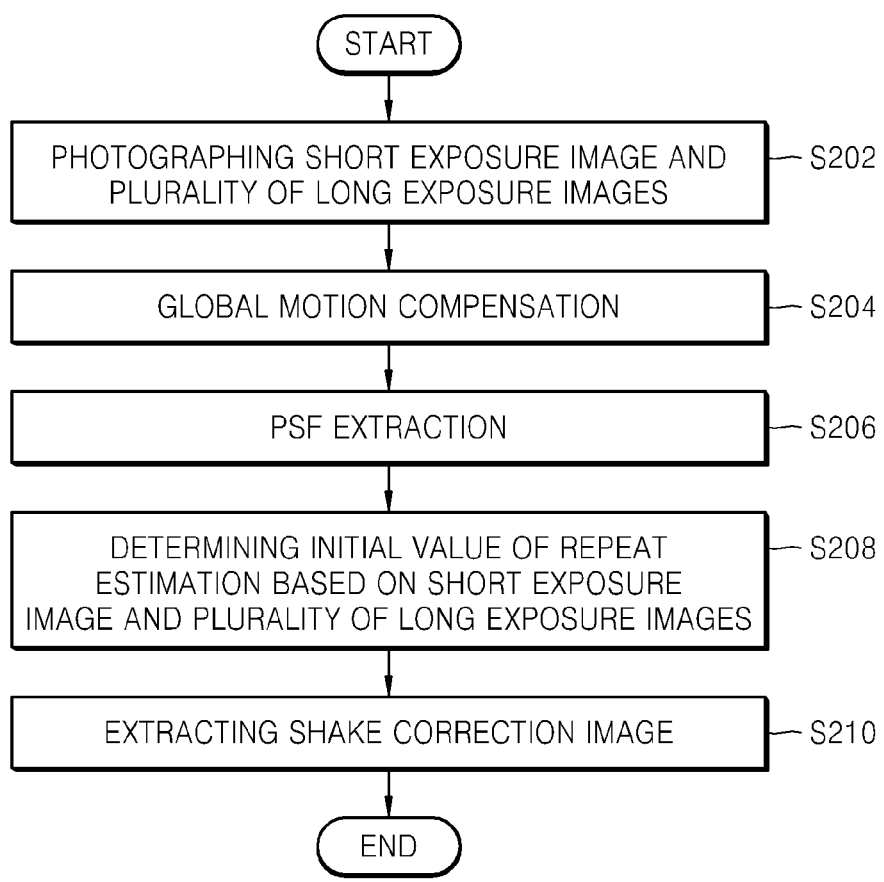
FIG. 2 is a flow chart illustrating a method of controlling the digital photographing apparatus, according to the embodiment.

FIG. 2 is a flow chart illustrating a method of controlling the digital photographing apparatus, according to the embodiment.

The method of controlling the digital photographing apparatus according to the embodiment extracts a shake correction image from a single sheet of short exposure image and a plurality of long exposure images.

First, the method of controlling the digital photographing apparatus according to the embodiment photographs the single sheet of short exposure image and the plurality of long exposure images (S202). At this time, the single sheet of short exposure image and the plurality of long exposure images are successively photographed in response to one shutter-release button input. The number of the plurality of long exposure images may be variously determined automatically or by a designer or user. The number of the plurality of long exposure images may be differently determined according to a performance of the digital photographing apparatus. For instance, in the case where a noise level of the image pickup device 115 of the digital photographing apparatus 100 is high, the number of the plurality of long exposure images may be determined as 2. In the case where the noise level of the image pickup device 115 of the digital photographing apparatus 100 is low, the number of the plurality of long exposure images may be determined as 4 or 8. Also, in the case of an astronomical digital photographing apparatus for photographing a low illuminant image, since the noise level of the image pickup device 115 is very low, it is possible to use more long exposure images.

Figure 3A:
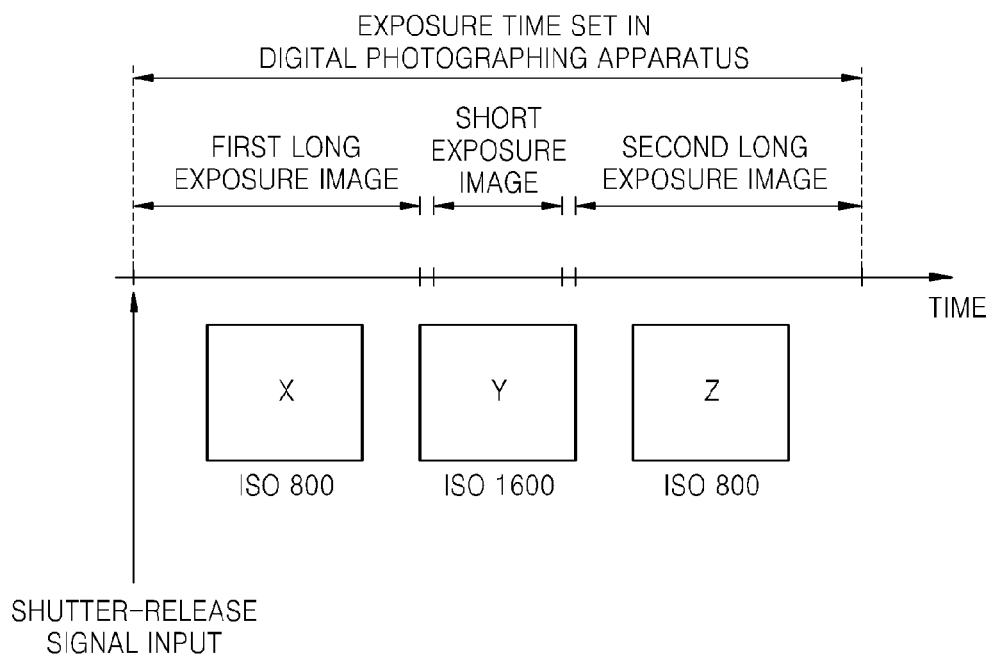
FIGS. 3A and 3B are diagrams for explaining the short exposure image and the plurality of long exposure images, according to the embodiment.
Figure 3B:
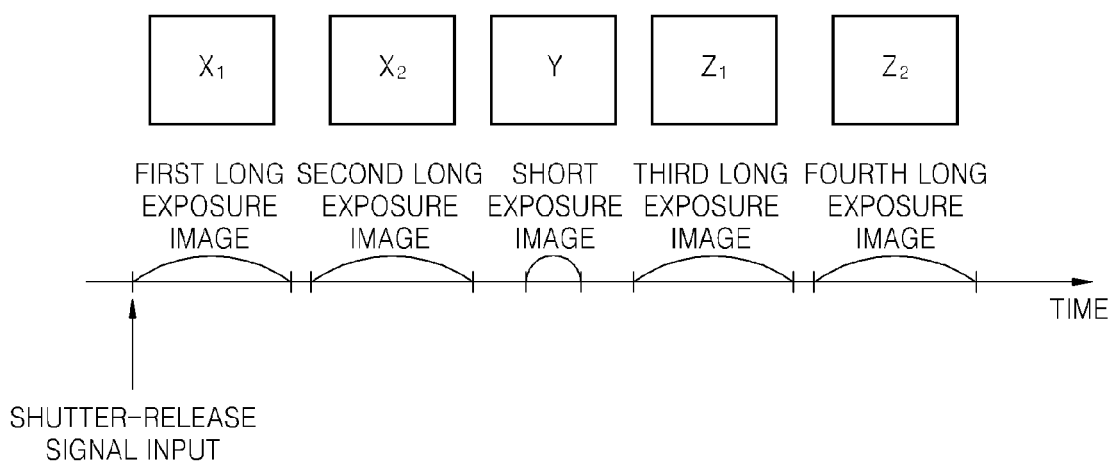

FIGS. 3A and 3B are diagrams for explaining the short exposure image and the plurality of long exposure images, according to the embodiment.

According to the embodiment, as illustrated in FIG. 3A, the shake correction image may be extracted by using one sheet of short exposure image Y and two sheets of long exposure images X and Z. The order of photographing the one sheet of short exposure image Y and two sheets of long exposure images X and Z may be variously determined. FIG. 3A illustrates the embodiment where the short exposure image is photographed in the middle of the two sheets of long exposure images.

When the shutter-release signal is input, the first long exposure image X, the short exposure image Y and the second long exposure image Z are successively photographed. At this time, exposure time of the first long exposure image X, the short exposure image Y and the second long exposure image Z is determined according to exposure time set in the digital photographing apparatus 100. For instance, the sum of exposure time of the first long exposure image X, the short exposure image Y and the second long exposure image Z may be configured as the same as the exposure time set in the digital photographing apparatus 100. Since there is shutter operating time during photographing an image, there may be a difference between the time taken for completing photographing the short exposure image Y and the plurality of long exposure images X and Z since the input of the shutter-release signal and the exposure time set in the digital photographing apparatus 100. For instance, in the case where the exposure time configured in the digital photographing apparatus 100 is 100 msec, the exposure time of the short exposure image Y may be 20 msec, and each exposure time of the first and the second long exposure images X and Z may be 40 msec. The exposure time of the short exposure image Y may be configured as the shortest exposure time supported by the digital photographing apparatus 100.

Also, a target brightness of the short exposure image Y and the plurality of long exposure images X and Z is configured as the same. To this end, a gain of the image pickup device 115 for the short exposure image Y and the plurality of long exposure images X and Z is appropriately determined according to the exposure time. For instance, in the above-explained example where the exposure time configured in the digital photographing apparatus 100 is 100 msec, the gain of the image pickup device 115 for the short exposure image Y may be configured as ISO 1600, and the gain of the image pickup device 115 for the plurality of long exposure images X and Z may be configured as ISO 800.

According to another embodiment, the exposure time of the short exposure image Y may be configured as the shortest exposure time supported by the digital photographing apparatus 100, and the exposure time of the plurality of long exposure images X and Z may be configured such that the sum of exposure time of the plurality of long exposure images X and Z is the same as the exposure time configured in the digital photographing apparatus 100.

FIG. 3B is a diagram illustrating an example where 5 images are used. In the case where the noise level of the image pickup device 115 included in the digital photographing apparatus 100 is low, a larger number of long exposure images, i.e., X1, X2, Z1 and Z2, may be used. When a larger number of long exposure images are used, as described below, a phase mixing phenomenon is more actively generated in a frequency region, and a ringing artifact may be more reduced in the shake correction image.

If the one short exposure image and the plurality of long exposure images are photographed (S202), on the basis of the short exposure image, a global motion of each of the long exposure images is compensated (S204).

Figure 4A:
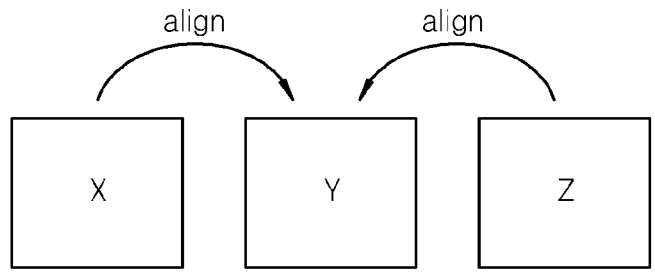
FIGS. 4A and 4B are diagrams for explaining the global motion compensation among the short exposure image and the plurality of long exposure images, according to the embodiment.
Figure 4B:
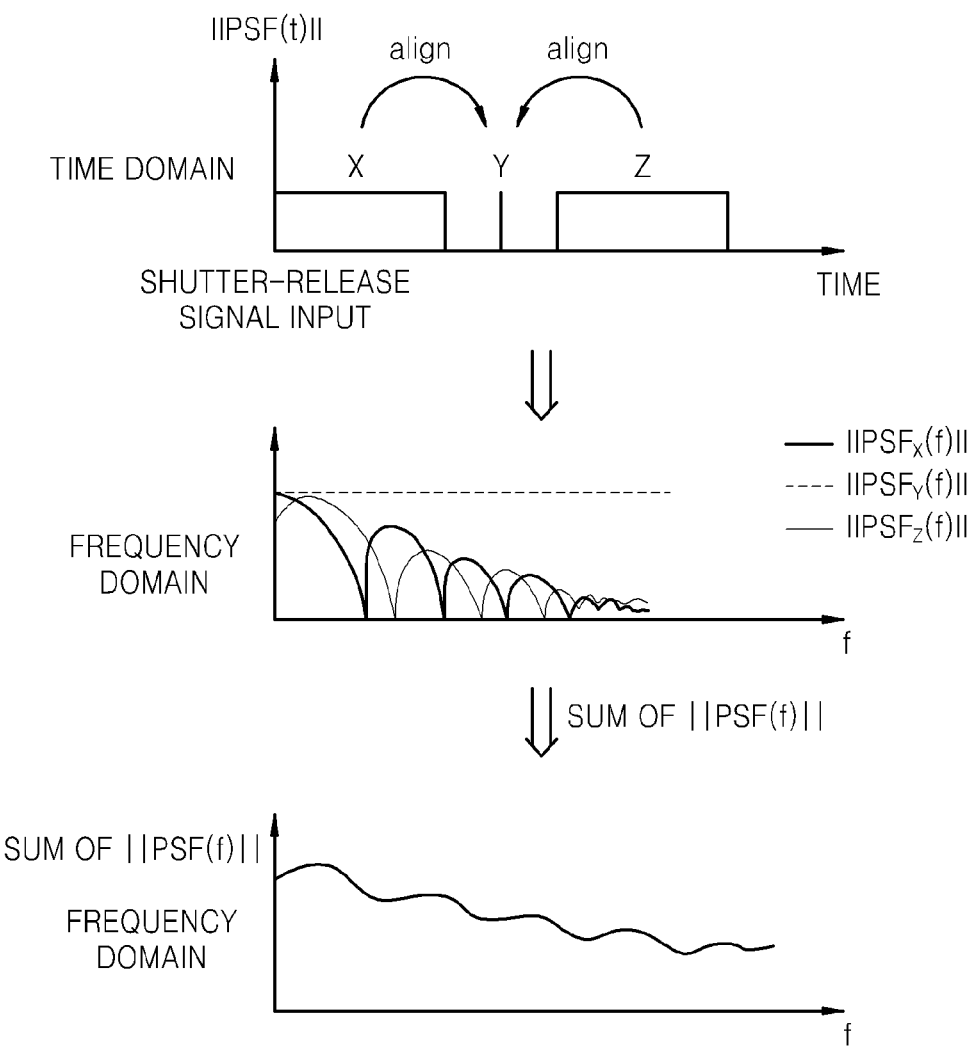

FIGS. 4A and 4B are diagrams for explaining the global motion compensation among the short exposure image and the plurality of long exposure images, according to the embodiment.

According to the embodiments, as illustrated in FIG. 4A, the global motion of the plurality of long exposure images X and Z is compensated on the basis of the short exposure image Y. The global motion means that all the pixels of the image are shifted due to a position variation of the digital photographing apparatus 100 between photographing the short exposure image and photographing the plurality of long exposure images. By performing the global motion compensation, the shift of all the pixels of the image is compensated so that pixels of the short exposure image and the long exposure image are aligned to correspond to one another.

In the case of performing the shake correction using one sheet of a photographed image, a ringing artifact may occur because a signal of some frequencies is not restored during restoration of an image. This phenomenon occurs because a Point Spread Function (PSF) has a zero-point where the PSF has a value of 0 in a frequency region. Due to this, since the shake is not corrected in the frequency band having the zero-point, the ringing artifact occurs in the shake correction image. The PSF means such a function, i.e., if the PSF is convolved with an image which is not blurred due to the shake, a blurred image is generated.

According to the embodiments, by using the one sheet of short exposure image Y and the plurality of long exposure images X and Z, the frequency band having the zero-point at the PSF may be eliminated almost completely. The global motion compensation to the one sheet of exposure image Y and the plurality of long exposure images X and Z increases the phase mixing phenomenon in the frequency region of a photographed image.

FIG. 4B illustrates the phase mixing phenomenon generated when the global motion compensation is performed to the short exposure image and the plurality of long exposure images. An energy function of PSF(t) of the short exposure image Y and the plurality of long exposure images X and Z may be represented at the time domain as illustrated in the first graph of FIG. 4B. At this time, it may be checked that the energy function of PSF(t) of the short exposure image Y is represented as an impulse function. If the PSF(t) of the time domain is converted into PSF(f) of the frequency domain, it may be represented as illustrated in the second graph of FIG. 4B. The energy function of the PSF(f) functions of the first long exposure image X and the second long exposure image Z, i.e., $PSF_X(f)$ and $PSF_Z(f)$, at the frequency domain, has the zero-point. However, the energy function of $PSF_Y(f)$ of the short exposure image Y represented as the impulse function at the time domain is not represented as 0 but represented as a DC component having a constant value.

Also, according to the embodiments, by the global motion compensation, the phase mixing among the short exposure image Y and the plurality of long exposure images X and Z is increased. The sum of energy function of PSF(f) of the short exposure image Y and the plurality of long exposure images X and Z whose global motion has been compensated may be represented as illustrated in the third graph of FIG. 4B at the frequency domain. As illustrated in the third graph of FIG. 4B, at the sum of energy function of PSF(f), the zero-point is remarkably reduced. Accordingly, the ringing artifact is remarkably reduced in the shake correction image.

Figures 5A, 5B:
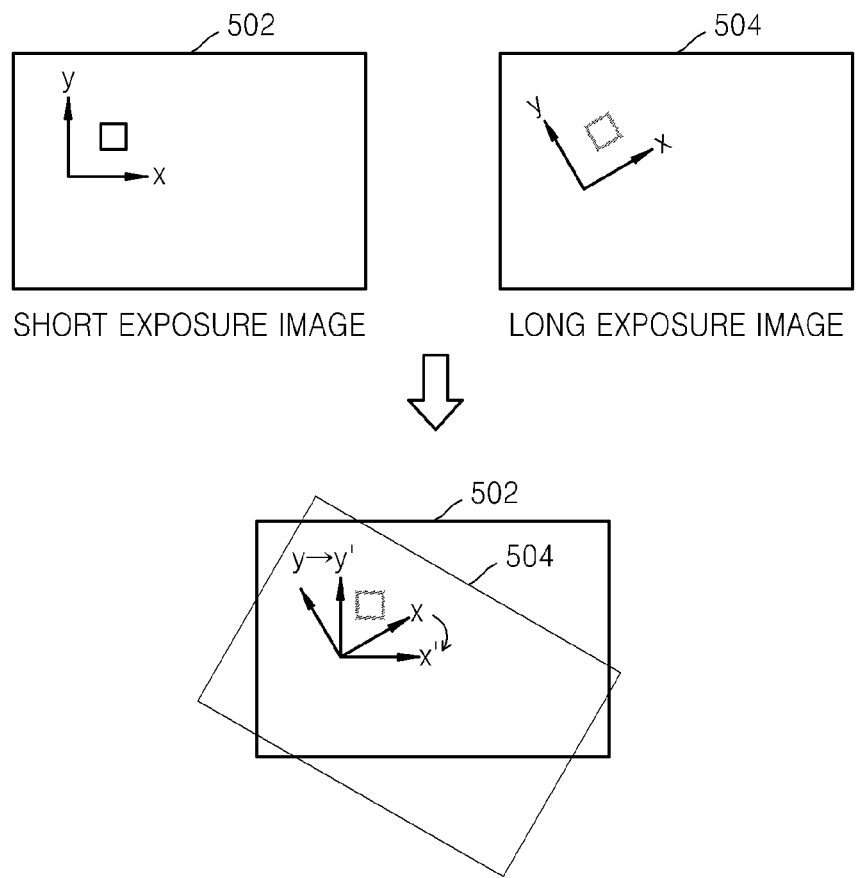
FIGS. 5A and 5B are diagrams for explaining a process of compensating the global motion between the short exposure image and the long exposure image, according to the embodiment.

FIGS. 5A and 5B are diagrams for explaining a process of compensating the global motion between the short exposure image and the long exposure image, according to the embodiment.

Although the short exposure image and the long exposure image are successively photographed, since they are photographed at different times, there may occur the global motion between the short exposure image and the long exposure image. For instance, as illustrated in FIG. 5A, the digital photographing apparatus 100 is slightly rotated between photographing the short exposure image 502 and photographing the long exposure image 504, and thus the subject of a rectangular shape may be photographed horizontally at the short exposure image 502 and photographed after being rotated counterclockwise at the long exposure image 504. In this case, for compensating the global motion between the short exposure image 502 and the long exposure image 504, on the basis of one image, the other image should be aligned. For instance, in the case where the long exposure image 504 is aligned on the basis of the short exposure 502, as illustrated in FIG. 5A, the global motion may be performed by rotating the long exposure image 504 clockwise. There may be various methods of compensating the global motion, e.g., estimating a parameter of an Affine motion.

FIG. 5B is a diagram illustrating an equation of the Affine motion.

According to the Affine motion, as illustrated in FIG. 5B, the coordinates (x, y) before the compensation is converted into the coordinates (x', y') after the global motion estimation. To this end, 6 parameters, i.e., a, b, c, d, e and f, for the Affine conversion are estimated. According to the Affine conversion, parallel movement, rotating movement, size variation and shearing between two images may be compensated. In the embodiment, the coordinates of the Affine-converted long exposure image may be represented as following Equation 1.

$$x'=ax+by+c$$
$$y'=dx+ey+f \quad \text{[Equation 1]}$$

Accordingly, if one of the short exposure image and the long exposure image is converted using the Affine conversion, the global motion between two images is compensated.

If the global motion among the short exposure image and the plurality of long exposure images is compensated (S204), each PSF of the short exposure image and the plurality of long exposure images is extracted (S206). The extraction of PSF may be performed using various algorithms.

Figure 6:
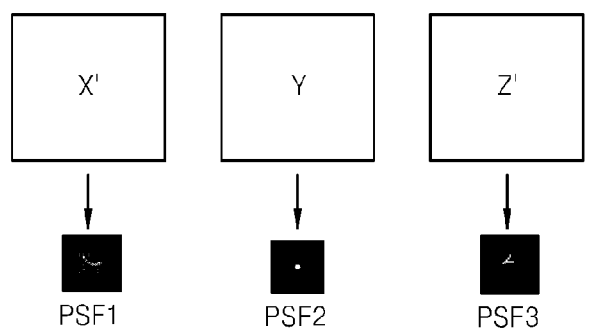
FIG. 6 is a diagram illustrating an exemplary PSF.

FIG. 6 is a diagram illustrating an exemplary PSF.

As illustrated in FIG. 6, the PSF of the plurality of long exposure images X' and Z', whose global motion has been compensated, may be represented as PSF1 and PSF3. The PSF represents a path of the shake. The PSF of the short exposure image Y may be represented as the impulse function as illustrated in PSF2 of FIG. 6.

If the PSF of the short exposure image and the plurality of long exposure images is extracted (S206), an initial value of repeat estimation is determined based on the short exposure image and the plurality of long exposure images (S208), and the shake correction image is extracted through the repeat estimation (S210).

Figure 7:
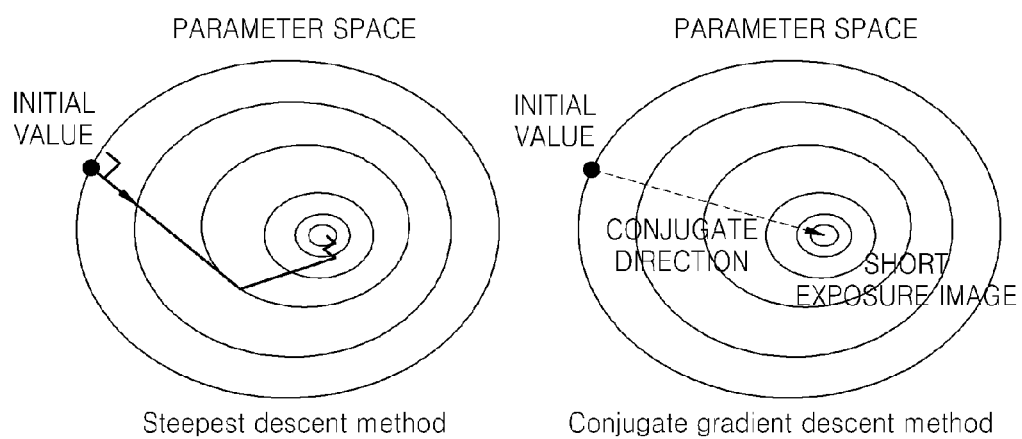
FIG. 7 is a diagram for explaining concepts of Maximum Likelihood (ML) estimation and Maximum a Posteriori (MAP) estimation, according to an embodiment.

FIG. 7 is a diagram for explaining concepts of Maximum Likelihood (ML) estimation and Maximum a Posteriori (MAP) estimation, according to an embodiment.

According to the embodiments, the shake correction image is extracted by using the MAP estimation. According to the MAP estimation, a likelihood distribution between observation data and a model is defined, and previous information called a prior which corresponds to properties of an image is added, and thus an optimum solution is estimated. The likelihood distribution between observation data and the model is similarly defined with the ML estimation method. In the shake correction, a relation between a blurred image B which is the observation data and the shake correction image L which is the optimum solution may be represented as following Equation 2.

$$B=PSF \otimes L+N \quad \text{[Equation 2]}$$

The optimum solution of the ML estimation may be represented as following Equation 3.

$$\hat{L}=\arg_L \min \|B-P \otimes L\|_2^2 \quad \text{[Equation 3]}$$

The ML estimation is repeatedly performed through repeat estimation until an update of L is converged using Steepest Descent Method. According to the Steepest Descent Method, as illustrated in the left side of FIG. 7, if an initial value is given, it is repeatedly performed updating a value until an optimum value is reached by using the properties where a gradient of the initial value is vertical to a contour surface of given parameter space. However, the ringing artifact may be considered as a kind of local minima which exist in the parameter space. That is, if the Steepest Descent Method is used, the optimum solution may not be reached being fallen in the local minima, and there may be a convergence at the local minima not at the optimum solution causing the ringing artifact.

The MAP estimation prevents the fall into the local minima at the repeat estimation by adding a prior function to the ML estimation. To this end, in the MAP estimation, the prior is added to a cost function of the ML estimation, and energy of the prior is increased when a result violates the image properties so that the energy of the data item and the prior item is balanced and thus the optimum solution is obtained. The prior function may be obtained using various methods, e.g., Laplacian prior, total variation prior or bilateral total variation prior. Although the embodiments using the Laplacian prior are mainly described in the specification, the scope of the invention is not limited by the embodiment which uses the Laplacian prior. The optimum solution of the MAP estimation may be represented as following Equation 4.

$$L^*=\arg_L \min f_{data}+\lambda f_{prior}=\arg_L \min \|B-P \otimes L\|_2^2 + \lambda \|\nabla L\|_2^2 \quad \text{[Equation 4]}$$

The repeat estimation for obtaining the optimum solution by using a conjugate gradient descent method may be represented as following Equation 5.

$$L_{i+1}=L_i+P^*(B-P \otimes L)+\lambda \|\nabla L\| \quad \text{[Equation 5]}$$

Herein, $\lambda$ represents a regulation factor, and $\nabla L$ represents the Laplacian of L. In Equation 5, a data item $\nabla F_{data}$ is $P^*(B-P \otimes L)$, and a prior item $\nabla F_{prior}$ is $\lambda \|\nabla L\|$. The repeat estimation is performed balancing the energy of the data item and the prior item.

According to the embodiments, an amended conjugate gradient descent method is used for finding the optimum solution of L by using the MAP estimation. According to the conjugate gradient descent method, by using self correlation (having properties of even function, odd function) of the parameter space, a conjugate direction which shows a direction of the optimum solution is detected through operating twice in the manner of such a method like the Steepest Descent Method. As a result, unlike the Steepest Descent Method, it is not easily fallen into the local minima, and it has been proved that the optimum solution is reached if the number of times of repetition becomes the number of the parameters to be estimated.

However, in the case of the shake correction, if the conjugate gradient descent method is used by using only the plurality of long exposure images, the parameter space cannot maintain its self correlation due to effects of a plurality of PSFs. As a result, the exact estimation of the conjugate direction is difficult. Due to this, many repetitions are required, or an inaccurate solution is reached. According to the embodiments, as illustrated in the right side of FIG. 7, short exposure is used for calculating an initial value of the shake correction and extracting the conjugate direction, and thus the conjugate direction is precisely calculated and the phenomenon of falling into the local minima does not occur.

FIGS. 8A and 8B are diagrams for explaining a process of the repeat estimation using the MAP estimation, according to an embodiment.

As illustrated in FIG. 8A, the repeat estimation is started from $L_0$. The $L_0$ is an initial value of the shake correction image. According to the embodiment, the $L_0$ is an average image of the short exposure image and the plurality of long exposure image. Next, for obtaining $L_1$, an initial value $m_1$ of the conjugate direction and an initial value of the prior function are needed. The initial value of the prior function is determined by the Laplacian $\|\Box L\|$ of $L_0$. The initial value $m_1$ of the conjugate direction is determined by using the short exposure image and the plurality of long exposure images as illustrated in FIG. 8B.

The initial value $m_1$ of the conjugate direction may be obtained as an average value of values, wherein the values is gained by applying the short exposure image Y and the long exposure images X and Z to $P^*(B-P \otimes L)$. First, an average value lavr of (B−P⊗L) is obtained by using the short exposure image Y and the global-motion-compensated plural long exposure images X' and Z'. Then, by extracting an average value of the lavr and a convolution of PSF of each image, the initial value $m_1$ of the conjugate direction is obtained. An initial value $\beta_1$ of a step size $\beta_i$, which shows a movement amount of the repeat compensation, may be obtained by using the initial value $L_1$ and the short exposure image Y as illustrated in FIG. 7. If $L_1$ is extracted, $L_1$ is determined thereafter through an operation between data items $\nabla f_{data}(L_{i-2})$ and $\nabla f_{data}(L_{i-1})$ to which previously estimated $L_{i-2}$ and $L_{i-1}$ are applied, as illustrated in FIG. 8A. The step size $\beta_i$ of each repeat estimation is determined by using previously estimated $\nabla f_{data}(L_{i-1})$, Hessian matrix $P^*\otimes P$ of PSF and the short exposure image Y. If the value of L is converged through the repeat estimation, the shake correction image is determined.

Figure 9:
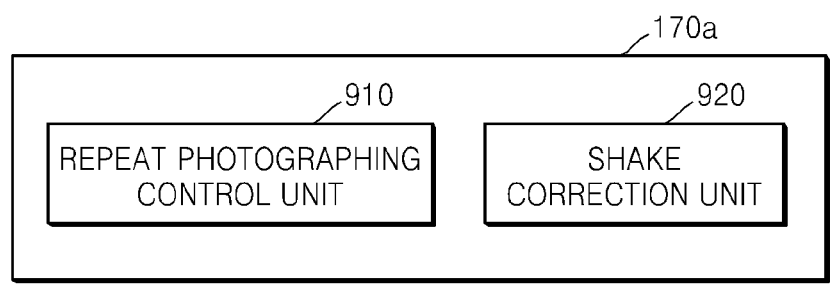
FIG. 9 is a diagram illustrating a structure of the digital signal processing unit, according to the embodiment.

FIG. 9 is a diagram illustrating a structure of the digital signal processing unit 170a, according to the embodiment. The digital signal processing unit 170a according to the embodiment includes a repeat photographing control unit 910 and a shake correction unit 920.

The repeat photographing control unit 910 successively photographs the one sheet of short exposure image and the plurality of long exposure images in response to an input of a signal of one shutter-release. To this end, the repeat photographing control unit 910 may provide the image pickup device control unit 116 and the shutter with the control signal for the repeat photographing. As above explained, the exposure time of the short exposure image and the plurality of long exposure images, and the sequence of the short exposure image and the plurality of long exposure images may be variously determined. Also, the number of the plurality of long exposure images may be determined according to the noise level of the image pickup device 115 of the digital photographing apparatus 100. For instance, the sum of exposure time of the short exposure image and the plurality of long exposure images may be configured as the same as the exposure time set in the digital photographing apparatus 100.

According to another embodiment, the exposure time of the short exposure image may be configured as the shortest exposure time supported by the digital photographing apparatus 100, and the exposure time of the plurality of long exposure images may be configured such that the sum of exposure time of the plurality of long exposure images is the same as the exposure time configured in the digital photographing apparatus 100.

The shake correction unit 920 extracts the shake correction image by using the short exposure image and the plurality of long exposure images photographed according to the control of the repeat photographing control unit 910.

Figure 10:
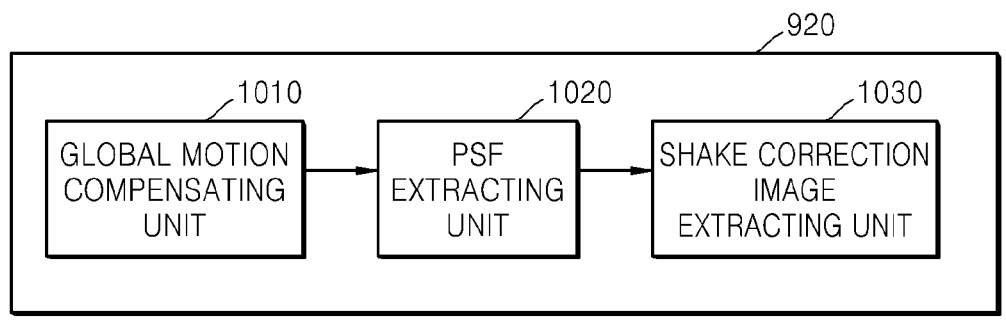
FIG. 10 is a diagram illustrating a structure of the shake correction unit, according to the embodiment.

FIG. 10 is a diagram illustrating a structure of the shake correction unit 920, according to the embodiment. The shake correction unit 920 according to the embodiment may include a global motion compensating unit 1010, a PSF extracting unit 1020 and a shake correction image extracting unit 1030.

The global motion compensating unit 1010 compensates the global motion of each of the plurality of long exposure images based on the short exposure image. The process of compensating global motion has been described referring to FIGS. 4A, 4B, 5A and 5B.

If the global motion among the short exposure image and the plurality of long exposure images is compensated, the PSF extracting unit 1020 extracts each PSF of the short exposure image and the plurality of long exposure images. The PSF extraction may be performed using various algorithms.

If the PSF of the short exposure image and the plurality of long exposure images is extracted, the shake correction image extracting unit 1030 determines the initial value of the repeat estimation based on the short exposure image and the plurality of long exposure images, and extracts the shake correction image through the repeat compensation. The shake correction image extracting unit 1030 according to the embodiment uses the shake correction image by using the MAP estimation and the conjugate gradient descent method. Also, it determines the initial value of the MAP estimation by using the short exposure image and the plurality of long exposure images. The process of extracting the shake correction image using the MAP estimation has been described referring to FIGS. 7, 8A and 8B.

The embodiments have effects of providing a digital photographing apparatus, a method of controlling the digital photographing apparatus and a computer-readable medium capable of providing a shake correction function with remarkably reduced ringing artifact.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

Also, using the disclosure herein, programmers of ordinary skill in the art to which the invention pertains can easily implement functional programs, codes, and code segments for making and using the invention.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A method of controlling a digital photographing apparatus, comprising:
    successively photographing one short exposure image and a plurality of long exposure images;
    compensating a global motion of each of the long exposure images based on the one short exposure image;
    extracting a Point Spread Function (PSF) of each of the one short exposure image and the long exposure images; and
    extracting a shake correction image through a repeat estimation by determining an initial value of the repeat estimation based on the one short exposure image and the long exposure images and using each PSF,
    wherein:
        the exposure times for the plurality of long exposure images are longer than the exposure time for the short exposure image, and
        the successively photographing one short exposure image and a plurality of long exposure images comprises successively photographing a plurality of long exposure images, photographing one short exposure image, and successively photographing a plurality of long exposure images in sequence.

2. The method of claim 1, wherein the extracting the shake correction image repeatedly estimates an estimation image by using a data function and a prior distribution function, wherein the data function is determined by Laplacian of a cost function and the prior distribution function is based on a prior distribution of the estimation image, wherein the cost function indicates a difference between a first image, which is a convolution of each PSF and the estimation image, and a shake image.

3. The method of claim 2, wherein the prior distribution function is determined by Laplacian of the estimation image.

4. The method of claim 2, wherein:
    an initial value of the estimation image is determined as an average image of the one short exposure image and the long exposure images;
    an initial value of the data function is determined by obtaining an average of data function values of each of the one short exposure image and the long exposure images; and
    an initial value of the prior distribution function is determined as a prior distribution function value of the average image of the one short exposure image and the long exposure images.

5. The method of claim 2, wherein the cost function is a norm of the first image and the shake image, and the data function is Laplacian of the cost function.

6. A digital photographing apparatus, comprising:
    a repeat photographing control unit that successively photographs one short exposure image and a plurality of long exposure images;
    a global motion compensating unit that compensates each global motion of the long exposure images based on the one short exposure image;
    a Point Spread Function (PSF) extracting unit that extracts a PSF of each of the one short exposure image and the long exposure images; and
    a shake correction image extracting unit that extracts a shake corrected image through a repeat estimate of an estimation image using a data function, a prior distribution function, and each PSF, determines an initial value of a repeat estimation based on the one short exposure image and the long exposure images, and extract a shake correction image through the repeat estimation using each PSF,
    wherein:
        the exposure times for the plurality of long exposure images are longer than the exposure time for the short exposure image, and
        the repeat photographing control unit successively photographs a plurality of long exposure images, photographs one short exposure image, and successively photographs a plurality of long exposure images in sequence.

7. The digital photographing apparatus of claim 6, wherein the data function is determined by Laplacian of a cost function and the prior distribution function is based on a prior distribution of the estimation image, wherein the cost function indicates a difference between a first image, which is a convolution of each PSF and the estimation image, and a shake image.

8. The digital photographing apparatus of claim 7, wherein the prior distribution function is determined by Laplacian of the estimation image.

9. The digital photographing apparatus of claim 7, wherein
an initial value of the estimation image is determined as an average image of the one short exposure image and the long exposure images;
an initial value of the data function is determined by obtaining an average of data function values of each of the one short exposure image and the long exposure images; and
an initial value of the prior distribution function is determined as a prior distribution function value of the average image of the one short exposure image and the long exposure images.

10. The digital photographing apparatus of claim 7, wherein the cost function is a norm of the first image and the shake image, and the data function is Laplacian of the cost function.

11. A non-transitory computer-readable storage medium having stored thereon a program executable by a processor for performing a method of controlling a digital photographing apparatus, the method comprising:
successively photographing one short exposure image and a plurality of long exposure images;
compensating a global motion of each of the long exposure images based on the one short exposure image;
extracting a Point Spread Function (PSF) of each of the one short exposure image and the long exposure images;
determining an initial value of a repeat estimation based on the one short exposure image and the long exposure images; and
extracting a shake correction image through the repeat estimation using each PSF,
wherein:
the exposure times for the plurality of long exposure images are longer than the exposure time for the short exposure image, and
the successively photographing one short exposure image and a plurality of long exposure images comprises successively photographing a plurality of long exposure images, photographing one short exposure image, and successively photographing a plurality of long exposure images in sequence.

12. The non-transitory computer-readable storage medium of claim 11, wherein the extracting the shake correction image repeatedly estimates an estimation image by using a data function and a prior distribution function, wherein the data function is determined by Laplacian of a cost function and the prior distribution function is based on a prior distribution of the estimation image, wherein the cost function indicates a difference between a first image, which is a convolution of each PSF and the estimation image, and a shake image.

13. The non-transitory computer-readable storage medium of claim 12, wherein the prior distribution function is determined by Laplacian of the estimation image.

14. The non-transitory computer-readable storage medium of claim 12, wherein:
an initial value of the estimation image is determined as an average image of the one short exposure image and the long exposure images;
an initial value of the data function is determined by obtaining an average of data function values of each of the one short exposure image and the long exposure images; and
an initial value of the prior distribution function is determined as a prior distribution function value of the average image of the one short exposure image and the long exposure images.

15. The non-transitory computer-readable storage medium of claim 12, wherein the cost function is a norm of the first image and the shake image, and the data function is Laplacian of the cost function.

16. A method of controlling a digital photographing apparatus for photographing an image, comprising:
firstly photographing a plurality of long exposure images using a second exposure time;
secondly photographing a short exposure image using a first exposure time;
thirdly photographing a plurality of long exposure images using the second exposure time;
extracting a Point Spread Function (PSF) of each of the one short exposure image and the long exposure images; and
extracting a shake correction image from the short exposure image and the photographed long exposure images wherein extracting a shake correction image is performed through a repeat estimation of an estimation image using a data function, a prior distribution function, and each PSF, by determining an initial value of the repeat estimation based on the one short exposure image and the long exposure images and using each PSF,
wherein the firstly photographing, the secondly photographing, the thirdly photographing, and the extracting the shake correction image are performed in response to an input of a signal of one shutter-release,
a sum of total exposure time of the firstly photographing, the secondly photographing, and the thirdly photographing, is determined according to a set exposure time set in the digital photographing apparatus, and
the first exposure time is shorter than the second exposure time.

17. The method of claim 16, wherein a gain of an image pickup device of the digital photographing apparatus is determined so that the long exposure images and the short exposure image have a same brightness.

18. The method of claim 16, wherein the first exposure time corresponds to the shortest exposure time supported by the digital photographing apparatus.

19. A digital photographing apparatus, comprising:
a repeat photographing control unit that firstly photographs a plurality of long exposure images using a second exposure time, secondly photographs a short exposure image using a first exposure time, and thirdly photographs a plurality of long exposure images using the second exposure time in response to an input of a signal of one shutter-release; and
a shake correction unit that extracts a shake correction image from the short exposure image and the repeatedly photographed long exposure images, wherein the shake correction image is determined by:
extracting a Point Spread Function (PSF) of each of the one short exposure image and the long exposure images; and
extracting the shake correction image through a repeat estimation of an estimation image using a data function, a prior distribution function, and each PSF, by determining an initial value of the repeat estimation based on the short exposure image and the long exposure images and using each PSF,
wherein a sum of total exposure time of the short exposure image and the long exposure images is determined according to a set exposure time set in the digital photographing apparatus, and the first exposure time is shorter than the second exposure time.

20. The digital photographing apparatus of claim 19, wherein the repeat photographing control unit repeatedly photographs the long exposure image using the second exposure time and a first number of times, photographs the short exposure image using the first exposure time once, and repeatedly photographs the long exposure image using the second exposure time and a second number of times.

21. The digital photographing apparatus of claim 19, wherein the repeat photographing control unit controls an image pickup device of the digital photographing apparatus by determining a gain of the image pickup device so that the long exposure images and the short exposure image have a same brightness.

22. The digital photographing apparatus of claim 19, wherein the first exposure time corresponds to the shortest exposure time supported by the digital photographing apparatus.

* * * * *